(12) United States Patent
Barham et al.

(10) Patent No.: US 8,560,839 B2
(45) Date of Patent: Oct. 15, 2013

(54) TAMPER PROOF LOCATION SERVICES

(75) Inventors: Paul Barham, San Francisco, CA (US);
Joseph N. Figueroa, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 303 days.

(21) Appl. No.: 12/972,534

(22) Filed: Dec. 20, 2010

(65) Prior Publication Data

US 2012/0159156 A1    Jun. 21, 2012

(51) Int. Cl.
*H04L 29/06* (2006.01)

(52) U.S. Cl.
USPC ............... 713/156; 713/168; 713/170; 726/6

(58) Field of Classification Search
USPC .................. 713/156, 168, 170, 172; 726/6, 9
See application file for complete search history.

(56) References Cited

U.S. PATENT DOCUMENTS

| | | | |
|---|---|---|---|
| 7,624,424 B2 | 11/2009 | Morita et al. | |
| 7,853,786 B1 | 12/2010 | Fultz et al. | |
| 2002/0051540 A1 | 5/2002 | Glick et al. | |
| 2003/0217137 A1* | 11/2003 | Roese et al. | 709/223 |
| 2004/0123150 A1 | 6/2004 | Wright et al. | |
| 2006/0236369 A1 | 10/2006 | Covington et al. | |
| 2006/0277187 A1 | 12/2006 | Roese et al. | |
| 2008/0046965 A1* | 2/2008 | Wright et al. | 726/1 |
| 2008/0182592 A1 | 7/2008 | Cha et al. | |
| 2008/0289007 A1* | 11/2008 | Malik | 726/4 |
| 2010/0064341 A1* | 3/2010 | Aldera | 726/1 |
| 2011/0119379 A1* | 5/2011 | McCormack | 709/225 |

OTHER PUBLICATIONS

Ardagna, et al., "Access Control in Location-Based Services", Retrieved at << http://spdp.dti.unimi.it/papers/Chapter5-ACDS.pdf >>, Privacy in Location-Based Applications, Lecture Notes in Computer Science, vol. 5599, 2009, pp. 1-24.
Saroiu, et al., "Enabling New Mobile Applications with Location Proofs", Retrieved at << http://research.microsoft.com/en-us/um/people/alecw/hotmobile-2009.pdf >>, Proceedings of the 10th workshop on Mobile Computing Systems and Applications, Feb. 23-24, 2009, pp. 6.
Ardagna, et al., "Supporting Location Based Conditions in Access Control Policies", Retrieved at << http://spdp.dti.unimi.it/papers/asiaccs06.pdf >>, Proceedings of the 2006 ACM Symposium on Information, computer and communications security, Mar. 21-24, 2006, pp. 11.

(Continued)

*Primary Examiner* — Jeffrey Pwu
*Assistant Examiner* — Jayesh Jhaveri
(74) *Attorney, Agent, or Firm* — Rau Patents, LLC

(57) ABSTRACT

A secure location system is described herein that leverages location-based services and hardware to make access decisions. Many mobile computers have location devices, such as GPS. They also have a trusted platform module (TPM) or other security device. Currently GPS location data is made directly accessible to untrusted application code using a simple protocol. The secure location system provides a secure mechanism whereby the GPS location of a computer at a specific time can be certified by the operating system kernel and TPM. The secure location system logs user activity with a label indicating the geographic location of the computing device at the time of the activity. The secure location system can provide a difficult to forge, time-stamped location through a combination of kernel-mode GPS access and TPM security hardware. Thus, the secure location system incorporates secure location information into authorization and other operating system decisions.

16 Claims, 3 Drawing Sheets

(56) References Cited

OTHER PUBLICATIONS

Damiani, et al., "Data security in location-aware applications: an approach based on RBAC", Retreived at << http://www.cob.calpoly.edu/~ijics/ijics-1.pdf >>, International Journal of Information and Computer Security, vol. 1,No. 1/2, Jan. 2007, pp. 5-38.

M.M, et al., "Global Public Key Algorithm for secure location service in VANET", Retrieved at << http://ieeexplore.ieee.org/stamp/stamp.jsp?arnumber=05399277 >>, Intelligent Transport Systems Telecommunications,(ITST),2009 9th International Conference, Oct. 20-22, 2009, pp. 653-657.

"International Search Report", Mailed Date: Sep. 14, 2012, Application No. PCT/US2011/065707, Filed Date: Dec. 19, 2011, pp. 10.

* cited by examiner

TAMPER PROOF LOCATION SERVICES

BACKGROUND

Location services are becoming a more common part of common computing devices. Global positioning system (GPS) chips first became common in dedicated devices for providing directions, but are becoming more and more common in mobile phones, portable gaming devices, and laptop computers. Computer software is beginning to use a devices current location to provide a variety of services, such as local listings (e.g., for restaurants or other services), directions, weather information, and so forth. Some operating systems have been updated to include location services application programming interfaces (APIs) that software applications can invoke to get location information in a consistent way (e.g., without modifications for different hardware types).

Geographic location affects more than just the types of retailers that a user might be interested in finding. For example, many countries have export laws that restrict types of encryption that can be included in devices in those countries. Other countries restrict transport of content protected by copyright. Thus, a user's location may change the legal framework that affects how the user is permitted to use a computing device.

An operating system is usually responsible for enforcing access controls to data and services, and sometimes expected to provide an audit trail showing which users performed which actions. Currently, access control decisions are typically based on a notion of a security principal, most often identified by a user identifier (e.g., a username and password), and little else. With mobile computing devices, data and services can be accessed in a wide variety of geographical locations. Operating systems do not currently leverage location information to make decisions. There are also situations where it is desirable to be able to prove that the computer was in a certain location when a specific action was performed, but location services are not used for such instances today.

SUMMARY

A secure location system is described herein that leverages location-based services and hardware to make access decisions. Many mobile computers have location devices, such as GPS. They also have a trusted platform module (TPM) or other security device. Currently GPS location data is made directly accessible to untrusted application code using a simple protocol. The secure location system provides a secure mechanism whereby the GPS location of a computer at a specific time can be certified by the operating system kernel and TPM. In some embodiments, the secure location system logs user activity with a label indicating the geographic location of the computing device at the time of the activity. The secure location system can provide a difficult to forge (i.e., tamper-proof), time-stamped location through a combination of kernel-mode GPS access and TPM security hardware.

In some embodiments, the system provides a secure audit trail that can be used to verify that particular actions occurred at a particular location. The system can also restrict the use of operating system services or changes to access-control decisions based on geographic location and/or time. The secure location system performs these actions by making GPS hardware only accessible by the kernel. The TPM ensures operating system and boot loader code come from a trusted source. The operating system reads a secure GPS location and provides certified GPS/time data to user-space processes. The system forms a chain of trust from early in the boot process to the execution of user processes that monitors and controls how GPS information is provided and used by applications. Thus, the secure location system incorporates secure location information into authorization and other operating system decisions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
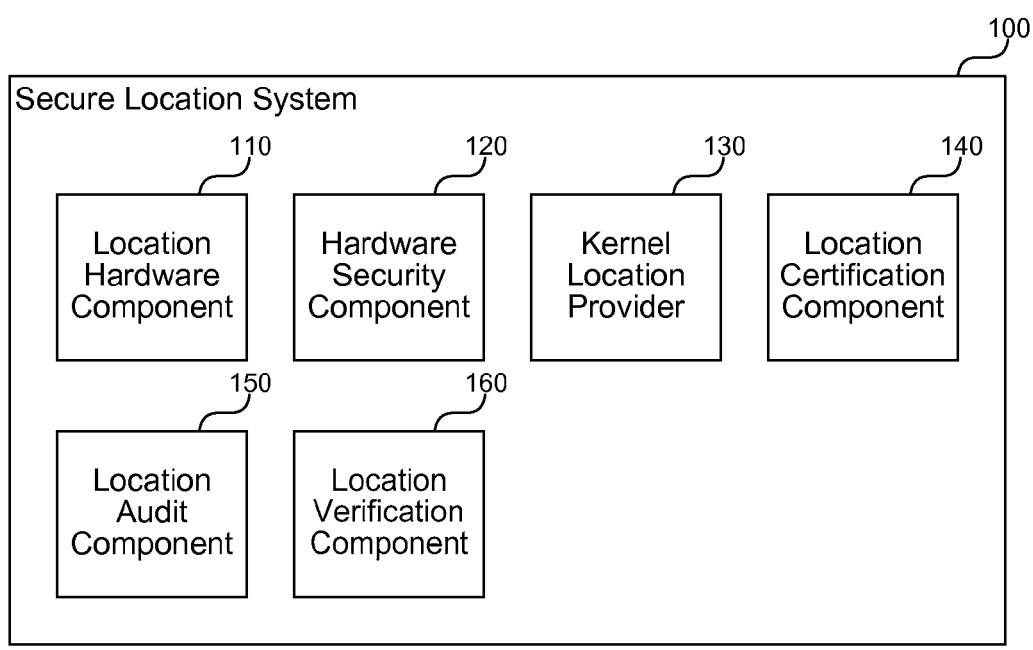
FIG. 1 is a block diagram that illustrates components of the secure location system, in one embodiment.

A secure location system is described herein that leverages location based services and hardware to make access decisions. For example, it is conceivable that an operating system should permit access to different subsets of files and services based on the physical location of the computer, e.g., do not allow access to certain files when in various countries or when out of the office. Many mobile computers have location devices, such as GPS. They also have a trusted platform module (TPM) or other security device. Currently GPS location data is made directly accessible to untrusted application code using a simple protocol (e.g. RS232 or USB). The secure location system provides a secure mechanism whereby the GPS location of a computer at a specific time may be certified by the operating system kernel and TPM. In some embodiments, the secure location system logs user activity with a label indicating the geographic location of the computing device at the time of the activity.

The secure location system can provide a difficult to forge (i.e., tamper-proof), time-stamped location through a combination of kernel-mode GPS access and TPM (or similar) security hardware. In some embodiments, the system provides a secure audit trail that can be used to verify that particular actions occurred at a particular location. The system can also restrict the use of operating system services or changes to (file) access-control decisions based on geographical location and/or time. For example, a company may provide access to one set of files on a laptop computer when the computer is within the company's corporate headquarters, but may reduce access to a smaller subset of files when the computer is taken elsewhere. As another example, the secure location system may use one type of encryption (e.g., for secure web page access) when a computing device is in a country that allows a limit of 56-bit encryption and another type of encryption in countries that allow higher levels of encryption. In this example, the operating system vendor can certify to each locality that the operating system adheres to that country's laws even though a shared set of binary modules may be shipped to each locale.

The secure location system performs these actions by making GPS hardware only accessible by the kernel, possibly with a private encrypted channel. The TPM ensures operating system and boot loader code come from a trusted source. The operating system reads a secure GPS location and provides certified GPS/time data to user-space processes. The system forms a chain of trust from early in the boot process to the execution of user processes that monitors and controls how GPS information is provided and used by applications. The system may include modified file, directory, and other resource metadata to include access-control lists with geographic regions embedded. For example, an administrator can specify not just who, but also where (and even when) a file can be accessed. File and directory timestamps (atime, ctime, mtime) can be augmented to include geographic location. The operating system augments its log of user activity (e.g., the MICROSOFT™ WINDOWS™ security event log) with secure GPS location data. Applications can read and obtain a certificate of location. When an application reads a file, the data it gets back can be selected at the operating system or more secure level based on location. In some embodiments, the secure location system can replace the entire file system appearance at user level based on which country/region the computer is presently in (e.g., using a steganographic file system). Thus, the secure location system incorporates secure location information into authorization and other operating system decisions.

FIG. 1 is a block diagram that illustrates components of the secure location system, in one embodiment. The system 100 includes a location hardware component 110, a hardware security component 120, a kernel location provider 130, a location certification component 140, a location audit component 150, and a location verification component 160. Each of these components is described in further detail herein.

The location hardware component 110 provides a hardware signal that indicates a current geographic location of the system. For example, the component 110 may include a GPS, Wi-Fi, or cellular chip that provides latitude and longitude coordinates, triangulation information from which latitude and longitude can be derived, or other location information. Mobile devices can use a combination of hardware and other information (e.g., assigned Internet Protocol (IP) address) to determine an approximate or precise location of a computing device. The location hardware component 110 provides the root information from which the system's location is determined.

The hardware security component 120 provides a trustworthy computing guarantee for software code running on the system. The component 120 may include a TPM, processor serial number, cryptographic chain of trust, or other hardware and software components designed to provide authoritative information about the security of a computing device. In some cases, the system may include boot loader code that is stored encrypted and decrypted by a key within the TPM. This allows the TPM to verify that the boot loader code is safe and comes from a trusted source. In some cases, the key is the public portion of a public/private key pair and successful decryption with the public key indicates that the code was signed by a holder of the private key. After decrypting the boot loader code, the hardware security component 120 may continue to load an operating system in a similar fashion, verifying the source of the code being executed. Likewise, the system may verify a driver for the location hardware component 110 so that a secure chain of trust is created from the location hardware to the operating system.

The kernel location provider 130 provides an interface from an operating system kernel to user-mode services and applications that use location information. The interface may include one or more APIs that applications or operating system services can use to receive secure location information and make decisions based on a current location of the computing device. The kernel location provider 130 may include a pluggable model for providing drivers or other software for interacting with various location and security hardware devices to expose secure location information in a common way to applications and services.

The location certification component 140 retrieves a certificate indicating a current location from the location hardware component 110 and hardware security component 120. The certificate may include a signed indication of the location of the computing device and the time at which the certificate was generated. The hardware security component 120 may sign the certificate with a key or other cryptographic identifier specific to the computing device on which the certificate was generated as a sign of the source of the location information. Applications may store the certificate as proof that an action taken was performed based on verifiable location information.

The location audit component 150 stores an audit trail of secure location information associated with a computing device. The component may store one or more files, database entries, or other structured data that indicates one or more locations of the device at various times. In some embodiments, the location audit component 150 stores an indication of the device's location each time an application or service requests a location certificate from the location certification component 140. The system 100 may also periodically instruct the location audit component 150 to obtain location information from the location hardware component 110 and store an audit trail with the received information. This allows an administrator or other user to later verify where the computing device has traveled, and potentially what actions were performed at each location. In some embodiments, the administrator may install software on the computing device that periodically uploads the audit trail to a central repository so that an organization can track where and how devices associated with the organization are being used. The system 100 may also provide alerts or notifications to IT personnel if, for example, a device is taken outside of a defined acceptable location boundary. For example, a company may want to prevent pre-release computing devices from leaving a test lab or corporate building.

The location verification component 160 requests location information from the kernel location provider 130 and performs one or more actions based on received location information. A computing device may have many applications and services that include a location verification component 160 that makes decisions based on the device's current location. For example, a file system filter may determine which files applications can access based on the current location of the device. A mapping location may display a map and other information based on the current location of the device. The operating system may enable and disable features based on local laws or other restrictions based on the location of the device. The chain of trust enforced from the earliest boot of the device to the kernel layer allows applications and services to trust the location information received from the operating system.

The computing device on which the secure location system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
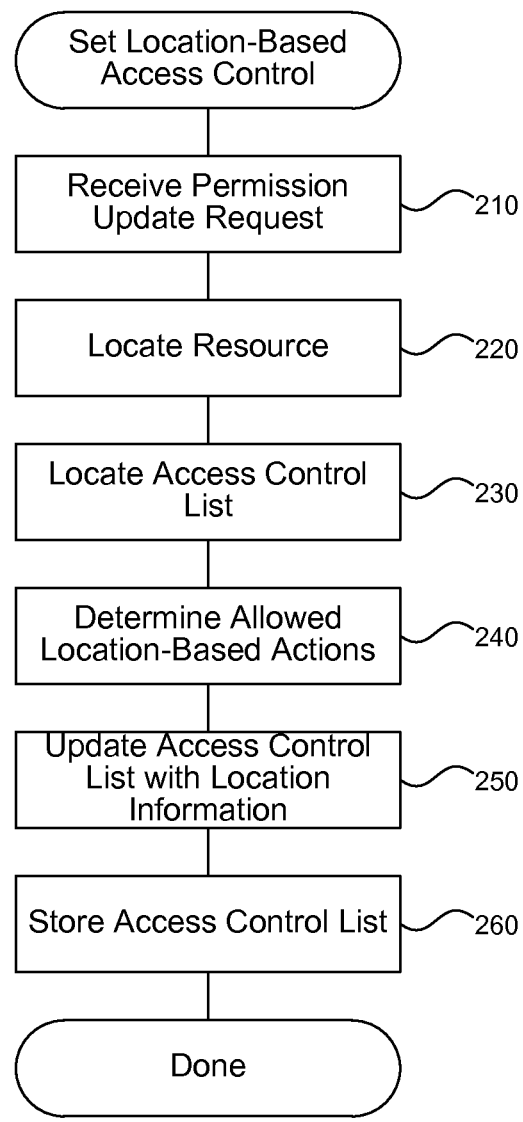
FIG. 2 is a flow diagram that illustrates processing of the secure location system to set resource permissions based on location information, in one embodiment.

FIG. 2 is a flow diagram that illustrates processing of the secure location system to set resource permissions based on location information, in one embodiment. Resources may include files, directories, printers, configuration entries, user accounts, or any other object within an operating system that typically includes security information, such as an access control list (ACL) or access control entry (ACE). The secure location system expands these data structures to include location information as a permission criterion for accessing a resource.

Beginning in block 210, the system receives a permission update request to update permissions for an identified resource to include location-based permission information. For example, an application may send the request through an operating system API or a user may cause a shell program or other tool to submit the request. The request identifies the resource by a path or other identifier and includes access control information, such as an ACL and/or ACE that includes geographic location as at least one access criteria. For example, the request may indicate permissions for a file that can only be accessed from the United States.

Continuing in block 220, the system locates the identified resource. The resource may be stored on disk (e.g., a file or folder), within a configuration database (e.g., a registry entry), within a directory (e.g., Active Directory resources), and so forth. The system locates the resource to retrieve any related access control metadata associated with the entry. For example, the resource may include a record stored contiguously or in association with the resource, that specifies access control information.

Continuing in block 230, the system locates an access control list associated with the identified resource. In some embodiments, the system modifies existing operating system APIs to locate and retrieve access control information for geographical access restrictions. Operating systems typically include a robust set of security APIs for navigating and modifying access control information associated with various types of resources.

Continuing in block 240, the system determines one or more allowed actions from the location-based permission information accompanying the request. The actions may include whether the resource can be read, written, included in a listing, and so forth. The location-based permission information may identify a bounded geographic region, such as a rectangle with edges defined by coordinates, or other suitable region. For example, the system may receive a center point and a radius around the center point that identifies the geographic region in which the actions are or are not allowed to occur. Permissions can be both positive and negative in nature, indicating either something that is allowed or is not allowed with relation to the identified resource.

Continuing in block 250, the system updates the located access control list to include the allowed location-based actions. Access control lists often include a hierarchy of permission data related to which users can perform which actions, and the system modifies these lists to include where actions can be performed. Location-based access control information may be combined with other access control information, so that, for example, an administrator can read a file at any location, but a more limited user can only read the file within a specified geographic region.

Continuing in block 260, the system stores the updated access control list associated with the identified resource, so that subsequent attempts to access the identified resource will be subject to the specified location-based access information. For example, if the access control list indicates specific regions where an action can be performed, then the system will test whether an access request is occurring in that region before allowing the access. This process is described further with reference to FIG. 3. After block 260, these steps conclude.

Figure 3:
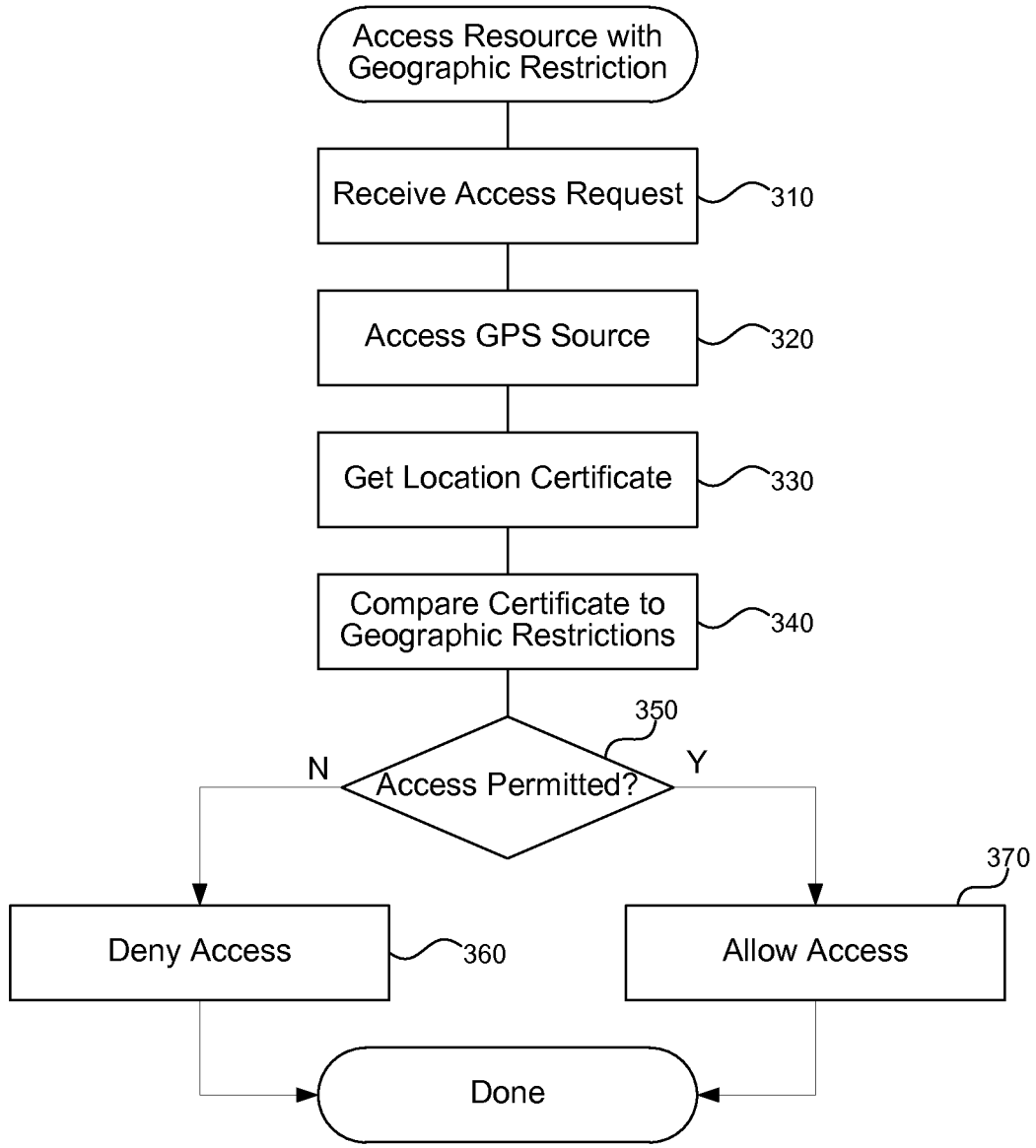
FIG. 3 is a flow diagram that illustrates processing of the secure location system to access a resource with location-based access permissions, in one embodiment.

FIG. 3 is a flow diagram that illustrates processing of the secure location system to access a resource with location-based access permissions, in one embodiment. Resources within a computing system may include location information as one of multiple criteria for accessing a resource. For example, a file may include a user and location restriction, so that a particular user can access the file from specified locations only.

Beginning in block 310, the system receives a request to access an identified resource, wherein the identified resource includes location-based access information. For example, the resource may include a file, directory, printer, computer peripheral, configuration database entry, or other resource for which an operating system defines and enforces access control. The request may come from an application calling an operating system API for accessing files or other resources. The request includes a security token that identifies a security principal associated with the request.

Continuing in block 320, the system accesses a secure source of location information. For example, the system may invoke an operating system API for requesting a location certificate from GPS and/or TPM hardware that provide a verifiable and auditable location indication. The location indication may include latitude and longitude coordinates or other location specification, as well as a timestamp and other identifying information that validates that the location information is current and has not been tampered with. The computing device may include a secure boot process that creates a chain of trust ensuring that the operating system has control of the location hardware and that the output related to location received from the operating system is trustworthy.

Continuing in block 330, the system receives a location certificate from the secure source of location information that indicates a current geographic location of a computing device on which the request was received. The certificate may include a signature or other cryptographically verifiable indication of the source of the location information. The recipient may query a TPM or other security hardware to verify the signature to ensure that no tampering has occurred with the location information provided in the certificate. The system may also create a log of issued location certificates that forms an audit trail for any later investigation of actions performed at particular locations.

Continuing in block 340, the system compares the location-based information provided by the received location certificate with at least one location-based restriction in an access control list associated with the identified resource. For example, the access control list may specify that the resource cannot be read or written outside the United States, can be read anywhere within the United States, and can be written only within a particular city. This is just one example, and those of ordinary skill in the art will recognize that access control list permit a variety of combinations of access restrictions to tailor access of a resource for any particular purpose.

Continuing in decision block 350, if the comparison indicates that the requested access of the resource is not permitted at the current location, then the system continues at block 360, else the system continues at block 370. Continuing in block 360, the system denies the access request. The system may provide an error message or other indication that the request is denied. In some embodiments the system may act as if the resource does not exist, effectively hiding the resource at times that access is not permitted due to location or other unmet restrictions. In some embodiments, the system may provide an error message that indicates under which conditions the resource could be accessed, so that, for example, a user could move the device to an allowed location.

Continuing in block 370, the system allows the access request and provides the requested access to the resource. For example, if the resource is a file, then the system may allow a request to open and view the contents of the file. In some embodiments, the system may allow the access request but replace the file data based on the determined location of the device. For example, the system may return a file system full of uninteresting data when the device is at some locations but return secret information when the device is at other locations. After block 370, these steps conclude.

In some embodiments, the secure location system facilitates implementation of a steganographic file system. A steganographic file system provides layers of access to data on a storage device. For example, a base layer may be accessible without a key or from any location and may include benign data that is not particularly security sensitive. The TPM or other secure hardware may provide a cryptographic key in response to an access request based on a current location of the device. Higher layers may provide increasingly more access to sensitive data to those that have the appropriate key. In this way, a computer may appear to be filled with benign data in one location but have security sensitive information in another location. This can provide a computer user with assurance that if the computing device is stolen, a malicious user will not have access to sensitive user information.

In some embodiments, the secure location system allows an operating system to provide different features based on location of a computing device running the system. For example, the secure location system may turn off cookies within a web browser if the computing device is in a country that restricts the use of cookies. As another example, the operating system may vary a level of encryption used for Secure Sockets Layer (SSL) or other encrypted communication based on local laws where the device is being used. Operating system vendors currently manage numerous Stock-Keeping Units (SKUs) of operating systems that each ship in a particular country. Not only is management of such SKUs difficult, but selling a particular SKU in a particular country is no guarantee that someone will not bring a non-compliant SKU into a country. Using the secure location system, an operating system vendor can ship a single SKU that automatically modifies its behavior based on secure knowledge of the location where it is being used, decreasing or eliminating the need for multiple SKUs and reducing management cost.

In some embodiments, the secure location system is used in embedded devices to facilitate location-based decisions. For example, a rental car company can include a device implementing the system in its rental fleet to enforce geographic restrictions about where a vehicle in the fleet is allowed to be driven. Some rental car companies may not want cars to leave a particular country or state, and can use the system to enforce this type of restriction. In other implementations, the company may allow use in other geographic regions, but may log information so that a different rate can be charged for the rental for each region that the vehicle is used in.

In some embodiments, the secure location system operates with a variety of location-based hardware. GPS chips in devices are common today from many different vendors, and the system can be modified to work with each of these. In addition, the system may employ GPS hardware that includes a substantially unique identifier per GPS chip that can be captured as part of the location certificate to identify a specific location authority that provided the location information. Processors and TPMs have used unique serial numbers for cryptographic and identification purposes so that specific instances can be banned if they are compromised and for other reasons. Similar techniques can be applied to GPS hardware to uniquely identify each GPS unit and to be able to deny access to untrustworthy instances.

In some embodiments, the secure location system uses a secure data communication channel between location hardware and security hardware, such as a GPS module and a TPM. The channel may include encrypted communications that allow the TPM to certify the output of the GPS chip and ensure a chain of trust that is tamper proof between the GPS hardware and operating system or applications. In some embodiments, access to resources may be protected with cryptographic keys managed by the TPM or other security hardware, and the TPM may hand out time-limited keys based on a current location of the device derived from the location hardware.

In some embodiments, the secure location system uses location information to enforce network security policies on a mobile computing device. For example, the system may use information that a laptop was recently overseas to determine that a virus scan should be completed before the device can access a corporate network. To do this, the network infrastructure accesses historical location information stored on the computing device that provides an audit trail of where the device has been since the last security check, if any. The system may restrict either incoming or outgoing networking traffic, or both. These and other policies can be enforced by the secure location system.

From the foregoing, it will be appreciated that specific embodiments of the secure location system have been described herein for purposes of illustration, but that various modifications may be made without deviating from the spirit and scope of the invention. Accordingly, the invention is not limited except as by the appended claims.

We claim:

1. A computer-implemented method for setting access permissions on a resource based on location information, the method comprising:
   receiving a permission update request to update permissions for an identified resource to include location-based permission information, the location-based permission information including at least geographic location information defining a geographic region upon which the location based permission is applied;
locating an identified resource;
locating location based access control information associated with the identified resource;
determining one or more allowed location based actions from the location-based permission information accompanying the request by determining whether the resource can be read, written, or included in a listing based on a geographic location of a computing device on which the resource is stored;
updating the location based access control information to include the one or more allowed location-based actions; and
storing the updated location based access control information associated with the identified resource, so that subsequent attempts to access the identified resource will be subject to the specified location-based permission information,
wherein the preceding steps are performed by at least one processor.

2. The method of claim 1 wherein the identified resource is an object managed by an operating system that includes associated security information including at least one access control list (ACL) or access control entry (ACE).

3. The method of claim 1 wherein receiving the permission update request comprises receiving the request from an application through an operating system application programming interface (API).

4. The method of claim 1 wherein receiving the permission update request comprises receiving information identifying the resource by a path receiving access control information that includes a geographic location as at least one access criteria.

5. The method of claim 1 wherein locating the identified resource comprises accessing the resource on disk, within a configuration database, or within a configuration directory and accessing related access control metadata associated with the resource.

6. The method of claim 1 wherein locating the access control information comprises invoking an operating system application programming interface (API) for navigating and/or modifying access control information that include location-based information.

7. The method of claim 1 wherein determining the one or more allowed location based actions comprises determining a geographic region based on one or more specified boundaries of the geographic region.

8. The method of claim 1 wherein updating the access control information comprises adding a hierarchical access control entry (ACE) that indicates a geographic region in which a specified action related to the identified resource is permitted.

9. The method of claim 1 wherein updating the access control information comprises combining location-based access control information with non-location-based access control information to indicate one or more criteria for accessing the identified resource.

10. A computer system for providing tamper-proof location services to software applications, the system comprising:
a location hardware component that provides a hardware signal that indicates a current geographic location of the system;
a hardware security component that provides a trustworthy computing guarantee for software code running on the system wherein the hardware security component verifies authentication information for a software driver associated with the location hardware component to create a secure chain of trust from the location hardware component to the operating system;
a processor and memory configured to execute software instructions embodied within the following components;
a kernel location provider that provides an interface from an operating system kernel to user-mode services and applications that use geographic location information;
a location certification component that retrieves a certificate indicating a current geographic location of the computer system with information from the location hardware component and hardware security component, wherein location certificates retrieved by the location certification component include a signed indication of the location of the computer system and the time at which the certificate was generated;
a location audit component that stores an audit trail of secure location information associated with the computer system, the location audit component further configured to periodically query the location hardware component to obtain current geographic location information of the system, the location audit component further configured to store an indication of the system's location each time an application or service requests a location certificate from the location certification component; and
a location verification component that requests location information from the kernel location provider and performs one or more actions based on received location information.

11. The system of claim 10 wherein the location hardware component comprises a global positioning system (GPS) hardware device that receives a GPS signal and determines a location of the system.

12. The system of claim 10 wherein the location hardware component comprises non-GPS hardware from which a geographic location can be derived based on supplemental information.

13. The system of claim 10 wherein the hardware security component includes a trusted platform module (TPM) that provides cryptographically verifiable authoritative information related to security of a computing device.

14. The system of claim 10 wherein the hardware security component and location hardware are connected via a secure channel for communication.

15. The system of claim 10 wherein the kernel location provides includes a pluggable model for providing drivers or other software for interacting with various location and security hardware devices to expose secure location information in a common way to applications and services.

16. A computer-readable storage device comprising instructions for controlling a computer system to access a resource with location-based access permissions, wherein the instructions, upon execution, cause a processor to perform actions comprising:
receiving a request to access an identified resource on a computing device, wherein the identified resource includes associated location-based access information, the request including a security token identifying a security principal associated with the request;
accessing a location hardware component having a secure source of location information;
querying the location hardware component to determine if the location hardware component has been tampered with;

receiving a location certificate from the secure source of location information that indicates a current geographic location of the computing device on which the request was received;

comparing the current geographic location information provided by the received location certificate with at least one location-based restriction in access control information associated with the identified resource; and when the comparison indicates that the requested access of the resource is permitted at the current geographic location, allowing the access request and providing the requested access to the resource.

\* \* \* \* \*